US008596400B2

(12) United States Patent
Muroo et al.

(10) Patent No.: US 8,596,400 B2
(45) Date of Patent: Dec. 3, 2013

(54) MOTORCYCLE

(75) Inventors: Sakio Muroo, Shizuoka (JP); Jun Hoshiba, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/238,091

(22) Filed: Sep. 21, 2011

(65) Prior Publication Data

US 2012/0073893 A1 Mar. 29, 2012

(30) Foreign Application Priority Data

Sep. 28, 2010 (JP) .................................. 2010-216771

(51) Int. Cl.
*B62J 25/00* (2006.01)
(52) U.S. Cl.
USPC ........................................ 180/219; 280/304.3
(58) Field of Classification Search
USPC ........................................ 180/219; 280/304.3
See application file for complete search history.

(56) References Cited

U.S. PATENT DOCUMENTS

| 4,815,555 | A  | * | 3/1989  | Kishi et al. ............... | 180/227 |
| 5,025,883 | A  | * | 6/1991  | Morinaka et al. .......... | 180/219 |
| 5,762,249 | A  | * | 6/1998  | Hann .......................... | 224/430 |
| 6,234,266 | B1 | * | 5/2001  | Saiki .......................... | 180/219 |
| 6,293,450 | B1 | * | 9/2001  | Aron .......................... | 224/430 |
| 6,349,783 | B1 | * | 2/2002  | Galbraith et al. .......... | 180/219 |
| 6,520,275 | B2 | * | 2/2003  | Galbraith et al. .......... | 180/219 |
| 7,278,560 | B2 | * | 10/2007 | Aron .......................... | 224/413 |
| 7,311,232 | B2 | * | 12/2007 | Watanabe et al. .......... | 224/413 |
| 7,648,169 | B2 | * | 1/2010  | Kobayashi .................. | 280/784 |
| 7,823,677 | B2 | * | 11/2010 | Minami et al. ............. | 180/219 |
| 8,162,091 | B2 | * | 4/2012  | Laperle et al. ............. | 180/219 |
| 2002/0153187 | A1 | * | 10/2002 | Tsukui et al. ............. | 180/219 |
| 2003/0063472 | A1 |  | 4/2003  | Ban et al. |  |
| 2011/0049205 | A1 | * | 3/2011  | Laperle et al. ............. | 224/425 |

FOREIGN PATENT DOCUMENTS

| CN | 101607582 A | 12/2009 |
| JP | 06-298144 A | 10/1994 |
| JP | 2006-182150 A | 7/2006 |
| JP | 4083402 B2 | 4/2008 |
| JP | 2009-051229 A | 3/2009 |
| JP | 2009-107566 A | 5/2009 |

OTHER PUBLICATIONS

Official Communication issued in corresponding European Patent Application No. 11178431.0, mailed on Sep. 17, 2013.
Khan, "Bajaj Pulsar 135 Is The GoodByeTraffic Bike," http://www.motorbeam.com/bikes/bajaj-pulsar-bikes/bajaj-pulsar-135is-the-goodbyetraffic-bike.com, downloaded Nov. 26, 2009, 4 pages.

* cited by examiner

*Primary Examiner* — Kevin Hurley
*Assistant Examiner* — Michael Stabley
(74) *Attorney, Agent, or Firm* — Keating & Bennett, LLP

(57) ABSTRACT

In a motorcycle, a seat frame portion connects to a main frame portion and extends rearward. A seat is arranged above the seat frame. A rear wheel is arranged below the seat frame portion. A rear arm supports the rear wheel in a vertically moveable fashion. A rear fender connects to the rear arm. The rear fender is situated at least partly between the seat frame portion and the rear wheel in the vertical direction. A sari guard is arranged at least partly to the side of the rear wheel. The rear end of the rear fender is situated rearward from the upper end of the rear wheel. The lower portion of the sari guard connects to the rear arm. The upper portion of the sari guard connects to the rear fender.

44 Claims, 12 Drawing Sheets

MOTORCYCLE

BACKGROUND OF THE INVENTION

1. Field of the Invention

The present invention relates to a motorcycle.

2. Description of the Related Art

While the problem of clothing becoming entangled in the rear wheel is not one encountered even in conventional motorcycles, some motorcycles include a sari guard located to the side of the rear wheel in order to prevent the sari from becoming soiled. The sari is a traditional costume worn in India or other countries. The sari is made of a long piece of fabric. When a rider wearing a sari is seated in a tandem seat, the sari hangs down to the side of the rear wheel, and therefore the sari is susceptible to becoming soiled by mud adhering to the rear wheel. The sari guard is provided for the purpose of preventing such soiling of the sari. For example, in the motorcycle disclosed in Japanese Unexamined Patent Application 2009-51229, the top portion of a sari guard 115 is secured to a seat rail 103 as shown in FIG. 11 herein. The sari guard 115 is arranged to cover the side of the rear wheel 107.

There is also a need to prevent mud from being splattered rearward by the rear wheel in motorcycles. For this reason, according to the motorcycle disclosed in Japanese Patent Publication 4083402, rearward mud splatter is prevented by a rear fender 135 that is supported on a seat rail 118, as shown in FIG. 12 herein.

Where the sari guard 115 is supported by the seat rail 103 as in the motorcycle disclosed in Japanese Unexamined Patent Application 2009-51229, the seat rail 103 increases in size. That is, the seat rail 103 needs to be increased in size in order to improve its support rigidity. For this reason, the increased size of the rear portion of the motorcycle, inclusive of the tandem seat 110, is a concern.

In order to improve the effectiveness of the rear fender 135 in preventing mud splatter, it is preferable for the rear fender 135 to have a shape that extends further rearward as in the motorcycle disclosed in Japanese Patent Publication 4083402. However, increasing the size of the rear fender 135 creates the need to also increase the size of the seat rail 118 which supports the rear fender 135. That is, in order to improve support rigidity, one approach is to increase the size of an upper pipe 118a and a lower pipe 118b, or to position further downward a connecting portion 120 of the lower pipe 118b that connects to the main frame 117, whereby support rigidity is ensured. In this case, the increased size of the rear portion of the motorcycle, inclusive of a body cover 113 which is situated to the side of the seat rail 118, is a concern. Also, it is difficult to simply extend rearward the fender 133 which is attached to a rear arm 108, with the aim of preventing mud splatter. This is because the fender 133 moves up and down together with the rear arm 108 and the rear wheel 109, and if the fender 133 is extended rearward, the effects of vibration on the fender 133 are considerable.

Thus, there is a difficulty associated with concomitantly inhibiting mud splatter from the rear wheel, inhibiting vibration of the rear fender, and inhibiting an increased size of the rear portion of the motorcycle.

SUMMARY OF THE INVENTION

Preferred embodiments of the present invention concomitantly inhibit mud splatter from the rear wheel, inhibit vibration of the rear fender, and inhibit an increased size of the rear portion of the motorcycle.

A motorcycle according to a first aspect of the present invention includes a main frame portion, a seat frame portion, a seat, a rear wheel, a rear arm, a rear fender, and a sari guard. The seat frame portion connects to the main frame portion and extends rearward. The seat is arranged above the seat frame portion. The rear wheel is arranged below the seat frame. The rear arm supports the rear wheel in a vertically moveable fashion. The rear fender connects to the rear arm. The rear fender is situated at least partly between the seat frame portion and the rear wheel in the vertical direction. The sari guard is arranged at least partly to a side of the rear wheel. A rear end of the rear fender is situated rearward from an upper end of the rear wheel. A lower portion of the sari guard connects to the rear arm. An upper portion of the sari guard connects to the rear fender.

A motorcycle according to a second aspect of the present invention relates to the motorcycle according to the first aspect. The motorcycle further includes a support member. The support member includes a lower portion connected to the rear arm and an upper portion connected to the rear fender. The rear wheel is arranged between at least a portion of the sari guard and at least a portion of the support member in the vehicle widthwise direction.

A motorcycle according to a third aspect of the present invention relates to the motorcycle according to the second aspect. In the motorcycle, the support member includes a first support portion and a second support portion. A connecting portion of the first support portion and the rear fender is situated frontward from a connecting portion of the second support portion and the rear fender.

A motorcycle according to a fourth aspect of the present invention relates to the motorcycle according to the third aspect. In the motorcycle, the support member further includes a linking portion linking the first support portion and the second support portion.

A motorcycle according to a fifth aspect of the present invention relates to the motorcycle according to the second aspect. The motorcycle further includes a linking member. The linking member links the sari guard and the support member. The linking member is arranged at least partly between the rear fender and the rear wheel in the vertical direction.

A motorcycle according to a sixth aspect of the present invention relates to the motorcycle according to the fifth aspect. In the motorcycle, the linking member is a plate-shaped member, i.e., having a substantially flat shape, hereinafter referred to as plate-shaped.

A motorcycle according to a seventh aspect of the present invention relates to the motorcycle according to the fifth aspect. In the motorcycle, the sari guard, the support member, and the linking member are provided as separate bodies.

A motorcycle according to an eighth aspect of the present invention relates to the motorcycle according to the first aspect. In the motorcycle, the sari guard connects to the rear fender at a plurality of connection locations spaced apart in the lengthwise direction of the rear fender.

A motorcycle according to a ninth aspect of the present invention relates to the motorcycle according to the first aspect. In the motorcycle, the seat includes a first seat and a second seat arranged rearward from and above the first seat. The second seat is arranged above a rear portion of the seat frame portion. There is no overlap of the rear fender and the seat frame portion in a side view when the rear wheel moves to an uppermost extent.

In the motorcycle according to the first aspect of the present invention, the rear end of the rear fender which moves together with the rear arm and the rear wheel is arranged rearward from the upper end of the rear wheel. Therefore, mud splatter from the rear wheel can be inhibited. Also, the lower portion of the sari guard connects to the rear arm, and the upper portion of the sari guard connects to the rear fender. Consequently, the rear fender is supported not only by the rear arm but also by the sari guard. Therefore, despite an increased size of the rear fender in the vehicle lengthwise direction, the effects of vibration on the rear fender may be inhibited. Further, because the sari guard is connected to the rear arm and the rear fender, an increased size of the rear portion of the vehicle inclusive of the seat frame may be inhibited, in contrast with the case where the sari guard is supported by the seat frame portion. By virtue of the above features, according to preferred embodiments of the present invention, it is possible to concomitantly inhibit mud splatter from the rear wheel, inhibit vibration of the rear fender, and inhibit an increased size of the vehicle rear portion.

In the motorcycle according to the second aspect of the present invention, the rear fender is supported by the sari guard and the support member. Therefore, the support rigidity of the rear fender is further improved. Vibration of the rear fender may be further inhibited thereby.

In the motorcycle according to the third aspect of the present invention, the rear fender is supported by the first support portion and the second support portion. The support rigidity of the rear fender is further improved thereby.

In the motorcycle according to the fourth aspect of the present invention, the linking portion links the first support portion and the second support portion. The support rigidity of the rear fender is further improved thereby. For example, the support rigidity of the rear fender with respect to movement tending to twist the rear fender is improved.

In the motorcycle according to the fifth aspect of the present invention, the sari guard and the support member are linked by the linking member. The support rigidity of the rear fender can be further improved thereby. Moreover, the linking member can be shorter than in the case of a linkage passing over the rear fender.

In the motorcycle according to the sixth aspect of the present invention, the linking member is plate-shaped, and therefore the rear wheel and the rear fender can be arranged close together. The rear wheel and the rear fender can be made more compact thereby.

In the motorcycle according to the seventh aspect of the present invention, the sari guard, the support member, and the linking member can be transported in a disassembled state. In this case, deformation due to external forces is less likely to occur, as compared to the case where the sari guard, the support member, and the linking member are unified. Therefore, transport is facilitated, and deformation is inhibited.

In the motorcycle according to the eighth aspect of the present invention, the sari guard can support the rear fender at a plurality of connection locations spaced apart in the lengthwise direction of the rear fender. Therefore, even if the rear fender has an increased size in the lengthwise direction, diminished support rigidity of the rear fender can be inhibited.

In the motorcycle according to the ninth aspect of the present invention, the rear portion of the vehicle can be made smaller, while ensuring visibility of the rider sitting in the second seat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
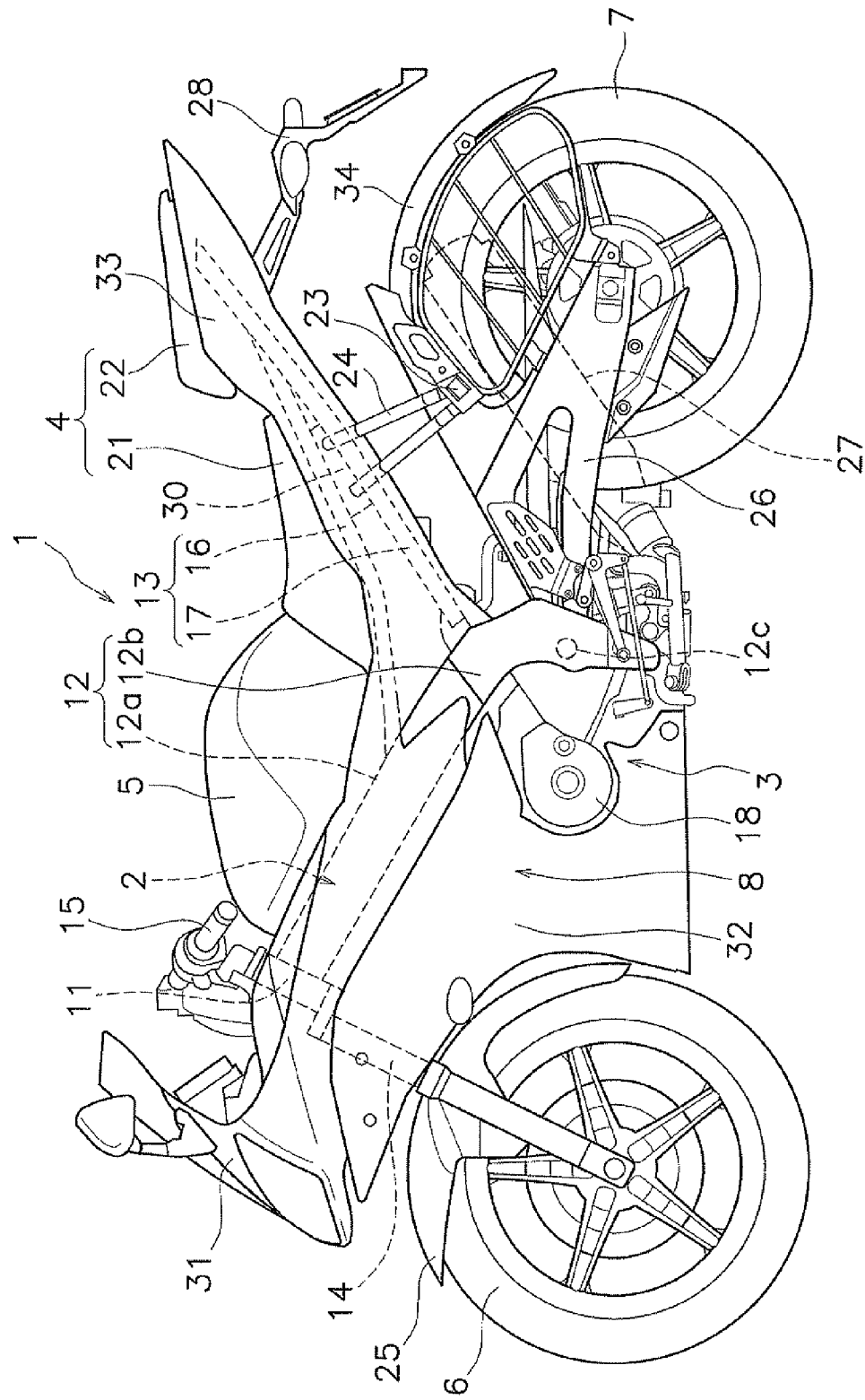
FIG. 1 is a left side view of a motorcycle according to a preferred embodiment of the present invention.

FIG. 1 shows a motorcycle 1 according to a preferred embodiment of the present invention. FIG. 1 is a left side view of the motorcycle 1. This motorcycle 1 is a motorcycle of so-called road sports type, and includes a body frame 2, a drive portion 3, a seat 4, a fuel tank 5, a front wheel 6, a rear wheel 7, and a body cover 8.

The body frame 2 includes a head pipe 11, a main frame portion 12, and a seat frame portion 13. A front fork 14 rotatably inserts into the head pipe 11. A handlebar 15 is fastened to the upper portion of the front fork 14. The main frame portion 12 is connected to the head pipe 11. The main frame portion 12 extends diagonally downward and rearward from the head pipe 11. The main frame portion 12 includes a first main frame portion 12a and a second main frame portion 12b. The first main frame portion 12a and the second main frame portion 12b are separate components. The first main frame portion 12a connects to the head pipe 11. The second main frame portion 12b connects to the first main frame portion 12a. The second main frame portion 12b includes a pivot shaft 12c which is rotatably mounted onto a rear arm 26, discussed below.

Figure 6:
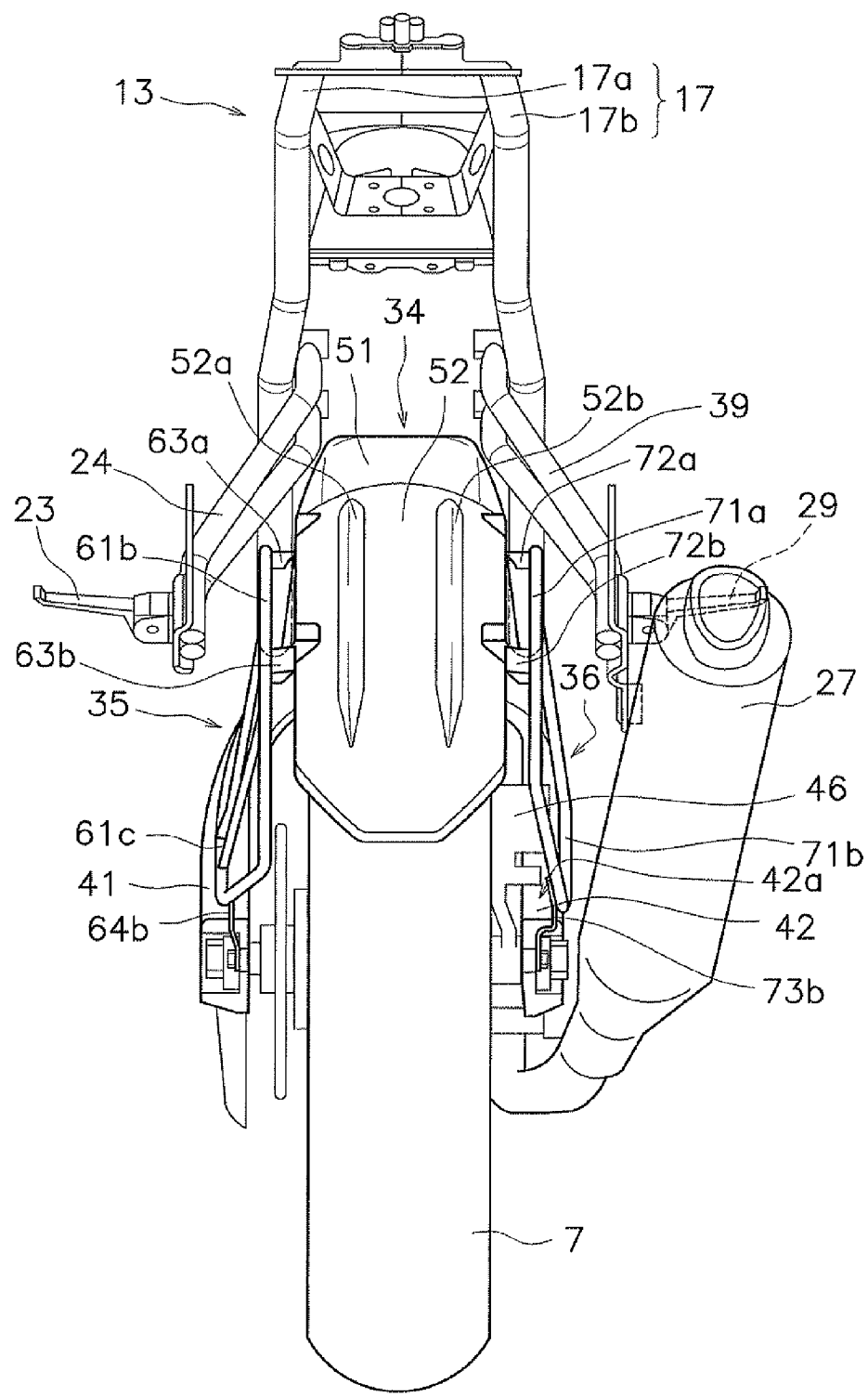
FIG. 6 is a rear view showing a construction in the vicinity of the rear wheel.

The seat frame portion 13 connects to the main frame portion 12 and extends diagonally upward and rearward from the main frame portion 12. The seat frame portion 13 includes an upper seat frame 16 and a lower seat frame 17. The front end of the upper seat frame 16 and the front end of the lower seat frame 17 respectively connect to the main frame portion 12. The rear end of the upper seat frame 16 and the rear end of the lower seat frame 17 are connected to each other. The lower seat frame 17 is arranged below the upper seat frame 16. As shown in FIG. 6, the lower seat frame 17 includes left and right lower seat frame portions 17a and 17b that are arranged to line up in the vehicle widthwise direction (i.e., a right-and-left direction). Like the lower seat frame 17, the upper seat frame 16 includes left and right upper seat frame portions (not shown) that are arranged to line up in the vehicle widthwise direction. In FIG. 6, the other frames, the body cover 8 and other components are omitted.

The drive portion 3 is arranged below the main frame portion 12. The drive portion 3 includes an engine 18 and a transmission (not shown). Drive force generated by the engine 18 is transmitted to the rear wheel 7 by the transmission and a chain (not shown).

The seat 4 is arranged above the seat frame portion 13. The seat 4 includes a main seat 21 and a tandem seat 22. The main seat 21 corresponds to the first seat of a preferred embodiment of the invention. The tandem seat 22 corresponds to the second seat of a preferred embodiment of the invention. The tandem seat 22 is arranged to the rear of the main seat 21. The tandem seat 22 is situated above the main seat 21. The tandem seat 22 is arranged above the rear portion of the seat frame portion 13. Foot steps 23 and 29 (see FIG. 6) for the rider in the tandem seat 22 (herein termed the "tandem rider") are arranged below the tandem seat 22. The foot step 23 is arranged to the left side of the rear wheel 7. The foot step 29 is arranged to the right side of the rear wheel 7. The foot step 23 is attached to the seat frame portion 13 via a step support member 24. Specifically, the foot step 23 is attached to the seat frame portion 13 separately from the sari guard 35, discussed below. The foot step 23 connects to the lower portion of the step support member 24. The upper portion of the step support member 24 is fastened to a mounting member 30 having a plate shape which is fastened to the seat frame portion 13. As shown in FIG. 6, the foot step 29 is fastened to the seat frame portion 13 separately from a support member 36, discussed below. The foot step 29 connects to the lower portion of a step support member 39. The upper portion of the step support member 39 is fastened to a mounting member having a plate shape (not shown) which is fastened to the seat frame portion 13.

The fuel tank 5 is arranged frontward from the seat 4. The upper surface of the rear portion of the tandem seat 22 mentioned above is arranged above the upper surface of the fuel tank 5.

The front wheel 6 is rotatably supported by the lower portion of the front fork 14. A front fender 25 is arranged above the front wheel 6.

The rear wheel 7 is arranged below the seat frame portion 13. The rear wheel 7 is rotatably supported by the rear portion of a rear arm 26, discussed below. A muffler 27 is arranged to the right side of the rear wheel 7.

The body cover 8 is a member that covers the body frame 2. The body cover 8 includes a front cover portion 31, a side cover portion 32, and a rear cover portion 33. The front cover portion 31 covers the front of the head pipe 11. The side cover portion 32 covers part of the drive portion 3 and the sides of the main frame portion 12. The rear cover portion 33 covers the sides and bottom of the seat frame portion 13.

Figure 2:
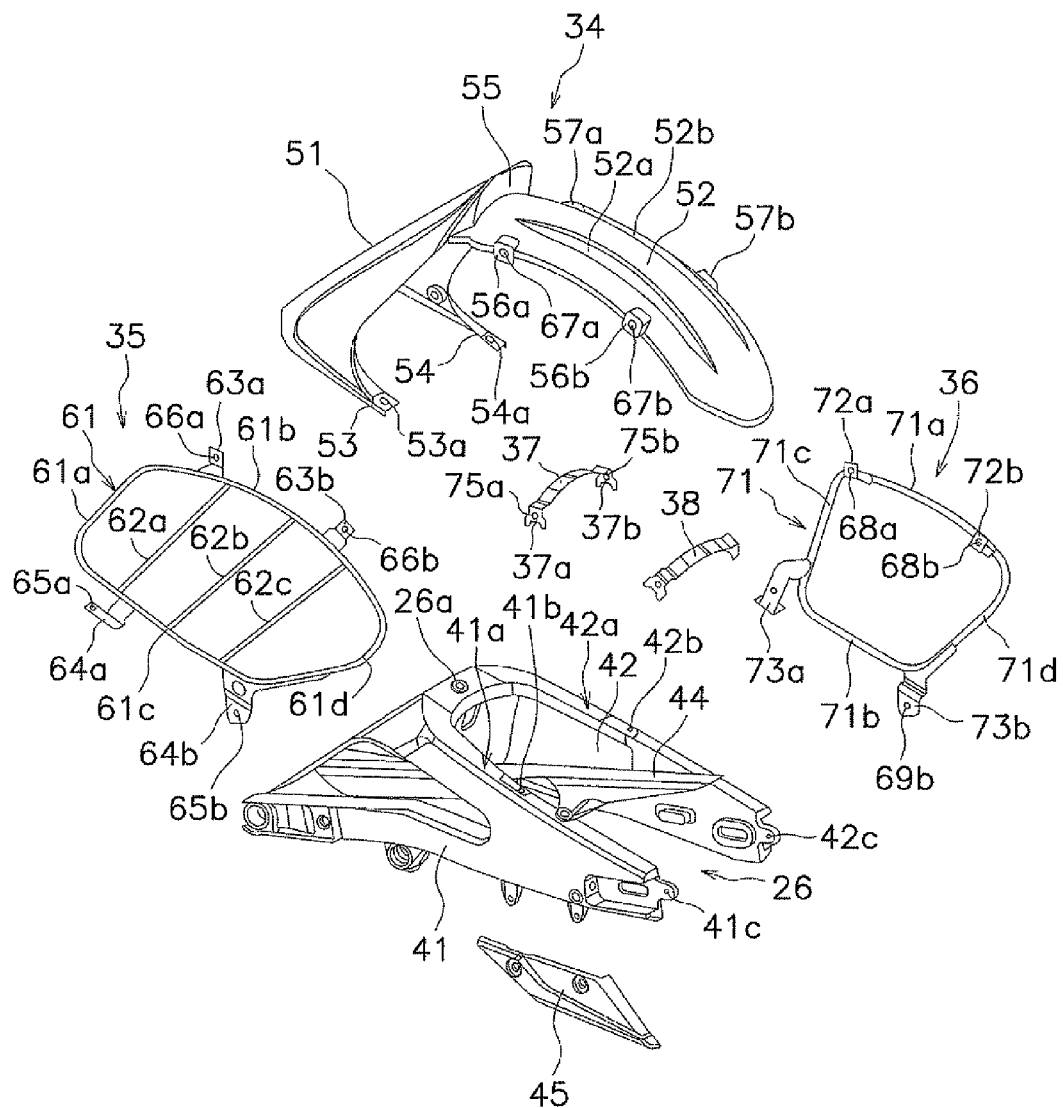
FIG. 2 is an exploded perspective view of the vicinity of a rear wheel.
Figure 3:
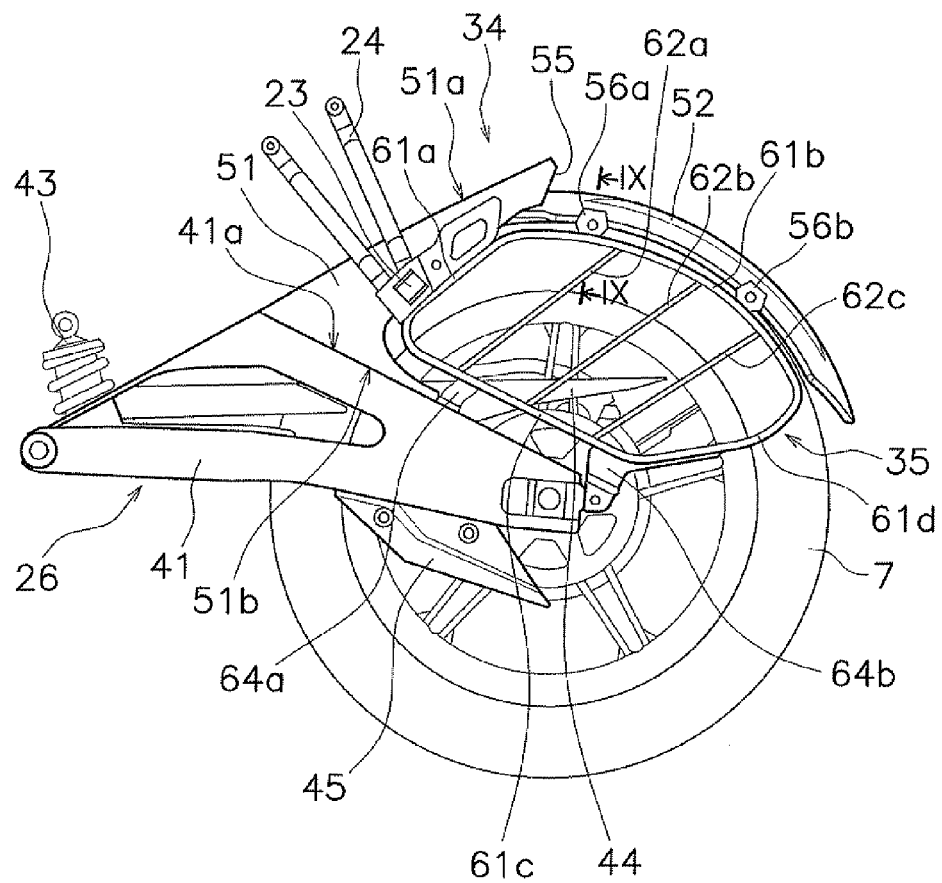
FIG. 3 is a left side view showing a construction in the vicinity of the rear wheel.
Figure 4:
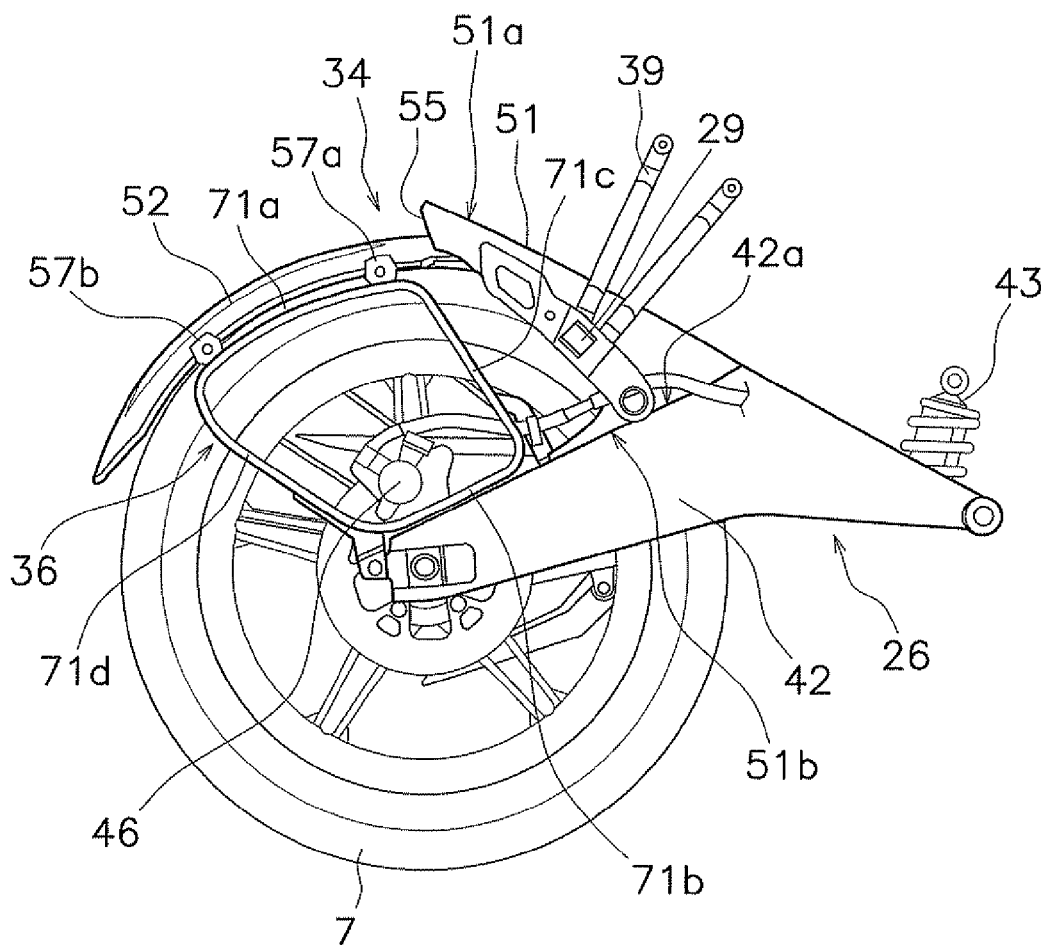
FIG. 4 is a right side view showing a construction in the vicinity of the rear wheel.

Next, the construction in the vicinity of the rear wheel 7 of the motorcycle 1 is described in detail. As shown in FIG. 2, the motorcycle 1 includes the rear arm 26, a first rear fender 34, the sari guard 35, the support member 36, and a plurality of linking members 37 and 38. FIG. 2 is an exploded perspective view of the vicinity of the rear wheel 7. A left side view of the construction in the vicinity of the rear wheel 7 is shown in FIG. 3. A right side view of the construction in the vicinity of the rear wheel 7 is shown in FIG. 4. In FIG. 4, the muffler 27 is not shown. In the present preferred embodiment, the terms "right", "left", "front", and "rear" refer to the directions observed by the rider when seated in the seat 4.

Figure 5:
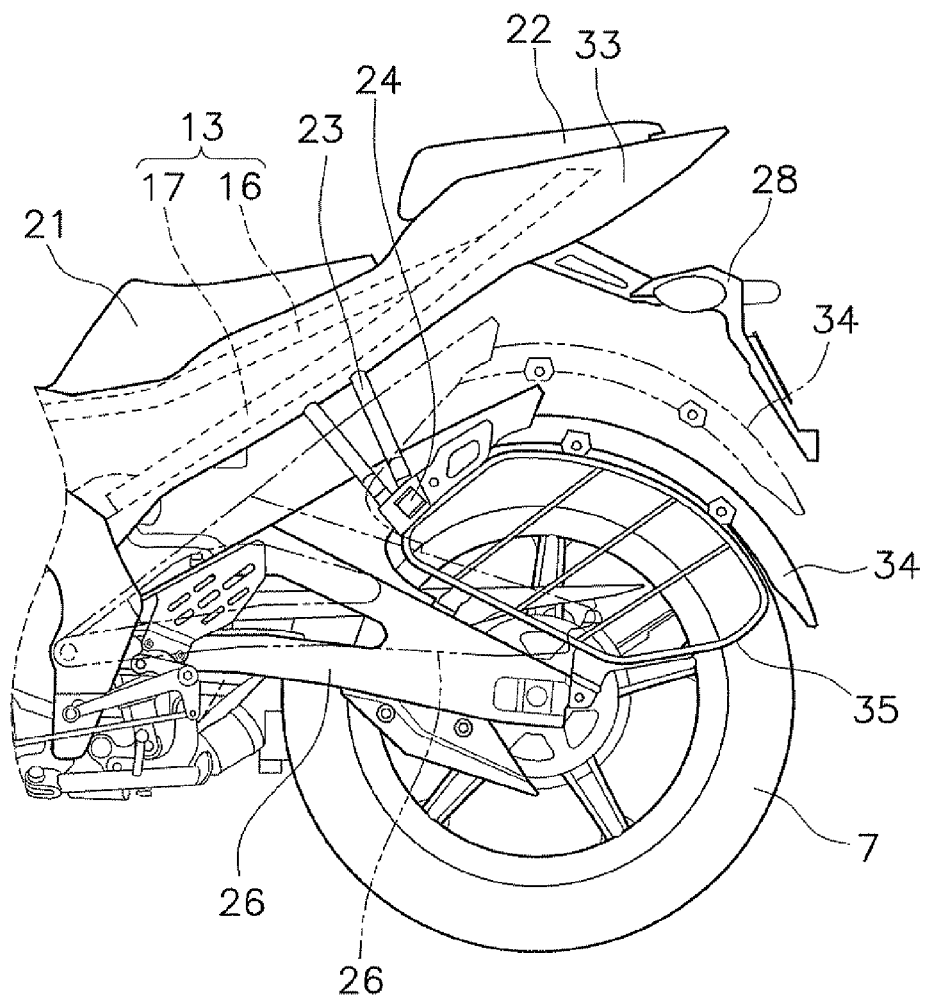
FIG. 5 is a drawing showing the range of possible motion of the rear fender.

As shown in FIGS. 3 and 4, the rear arm 26 rotatably supports the rear wheel 7. The rear arm 26 also supports the rear wheel 7 in a vertically moveable fashion. The front portion of the rear arm 26 is rotatably attached to the body frame 2. Specifically, the front portion of the rear arm 26 is attached in a vertically pivotable fashion via a bracket, not shown, to the lower rear end of the main frame portion 12. One end of a rear suspension 43 is attached to the front portion of the rear arm 26. The other end of the rear suspension 43 is attached to the body frame 2. As shown in FIG. 5, the rear arm 26 supports the rear wheel 7 in such a way that when the rear wheel 7 has moved to an uppermost extent, no overlap of the first rear fender 34 and the seat frame portion 13 is observed in side view (see the depiction of the first rear fender 34 by double-dot and dash lines in FIG. 5). In FIG. 5, only the first rear fender 34 and the rear arm 26, at their positions when the rear wheel 7 has moved to the uppermost extent, are shown by double-dot and dash lines.

The rear arm 26 includes a first arm portion 41 and a second arm portion 42. The first arm portion 41 and the second arm portion 42 are disposed in a generally lateral symmetrical arrangement. The first arm portion 41 and the second arm portion 42 are arranged spaced apart in the vehicle widthwise direction. The rear wheel 7 is arranged between the first arm portion 41 and the second arm portion 42 in the vehicle widthwise direction. The first arm portion 41 and the second arm portion 42 respectively extend in the lengthwise direction of the motorcycle (i.e., a back-and-forth direction) and have a tapered shape that is progressively smaller in a vertical dimension towards the rear portion. The rotating axle of the rear wheel 7 is rotatably attached to the rear portion of the first arm portion 41 and the rear portion of the second arm portion 42. The front portion of the first arm portion 41 and the front portion of the second arm portion 42 are linked to each other.

The upper surface 41a of the first arm portion 41 and the upper surface 42a of the second arm portion 42 have a generally flat shape. The upper surface 41a of the first arm portion 41 slopes downward towards its rear portion. Like the upper surface 41a of the first arm portion 41, the upper surface 42a of the second arm portion 42 also slopes downward towards its rear portion. A chain cover 44 is arranged inward from the first arm portion 41 in the vehicle widthwise direction. The chain cover 44 is arranged to the left side of the rear wheel 7. The chain cover 44 is arranged to cover a chain (not shown) which is engaged with the rear wheel 7. A cover member 45 is attached to the lower surface of the first arm portion 41. A rear brake 46 is arranged inward from the second arm portion 42 in the vehicle widthwise direction. As shown in FIG. 6, the rear brake 46 is partially situated above the upper surface 42a of the second arm portion 42 and arranged to overlap the upper surface 42a of the second arm portion 42 from above. FIG. 6 is a rear view showing the construction in the vicinity of the rear wheel 7, and portions of the construction shown in FIGS. 1 to 5 are omitted to facilitate understanding.

In the present preferred embodiment, "inward in the vehicle widthwise direction" means, in the widthwise direction, a direction going towards a center line that extends in the lengthwise direction through a widthwise center of the motorcycle 1. "Outward in the vehicle widthwise direction" means the direction opposite from inside in the widthwise direction of the motorcycle 1. Specifically, "outward in the vehicle widthwise direction" means a direction going away from the center line that extends in the lengthwise direction through the widthwise center of the motorcycle 1.

The first rear fender 34 connects to the rear arm 26 and covers the rear wheel 7 from above. The first rear fender 34 is a member preferably made of resin. As shown in FIG. 1, the first rear fender 34 is situated at least partially between the seat frame portion 13 and the rear wheel 7 in the vertical direction. The rear end of the first rear fender 34 is situated rearward from the upper end of the rear wheel 7. In more specific terms, the rear end of the first rear fender 34 is situated rearward from the rear end of the rear wheel 7. The front end of the first rear fender 34 is situated frontward from the front end of the rear wheel 7. Specifically, the first rear fender 34 covers the entire rear wheel 7 from above in the lengthwise direction. As shown in FIGS. 2 to 4, the first rear fender 34 includes a first fender portion 51 and a second fender portion 52.

As shown in FIGS. 3 and 4, the first fender portion 51 has a shape that, in a side view, extends diagonally upward and rearward from the upper surface of the rear arm 26. The upper surface 51a of the first fender portion 51 has a linear shape in the side view. The upper surface 51a of the first fender portion 51 slopes upward towards its rear portion. The lower surface 51b of the first fender portion 51 is attached across the upper surface 41a of the first arm portion 41 and the upper surface 42a of the second arm portion 42. Specifically, as shown in FIG. 2, the first fender portion 51 includes a plate-shaped first projecting portion 53 and second projecting portion 54, which project outward towards the rear. The first projecting portion 53 and the second projecting portion 54 include holes 53a and 54a that pass therethrough in the vertical direction, respectively. The upper surface 51a of the first fender portion 51 includes a hole (not shown) that passes therethrough in the vertical direction. On the upper surface 41a of the first arm portion 41, a hole 41b is provided at a location corresponding to the hole 53a of the first projecting portion 53. On the upper surface 42a of the second arm portion 42, a hole 42b is provided at a location corresponding to the hole 54a of the second projecting portion 54. On the upper surface of the rear arm 26, a hole 26a is provided at a location corresponding to the hole in the upper surface 51a of the first fender portion 51. The first fender portion 51 is fastened to the rear arm 26 by inserting screws through these holes.

The second fender portion 52 is a member having a plate shape and is disposed extending rearward from the first fender portion 51. The second fender portion 52 has a substantially curved shape along the rear wheel 7. The rear end of the second fender portion 52 is situated rearward of the rear end of the rear wheel 7. The second fender portion 52 covers a portion positioned rearward from the center of rotation of the rear wheel 7 from above. The dimension of the second fender portion 52 in the lengthwise direction is slightly greater than the radius of the rear wheel 7. The front end of the second fender portion 52 connects to the first fender portion 51 in a portion thereof situated below the upper end. Therefore, a step portion 55 is provided in a connecting portion of the first fender portion 51 and the second fender portion 52. As shown in FIG. 2, a plurality of protruding portions 52a and 52b are provided in the second fender portion 52. The protruding portions 52a and 52b protrude upward from the upper surface of the second fender portion 52. The protruding portions 52a and 52b extend along a longitudinal direction of the second fender portion 52. Specifically, the protruding portions 52a and 52b extend in the lengthwise direction in a top view. The protruding portions 52a and 52b are arranged spaced apart from one another in the vehicle widthwise direction. These protruding portions 52a and 52b have the effect of improving rigidity of the second fender portion 52. At the left edge portion of the second fender portion 52 there are disposed a plurality of guard fastening portions 56a and 56b. The guard fastening portions 56a and 56b are the portions to which the sari guard 35 is fastened. The plurality of guard fastening portions 56a and 56b are arranged spaced apart from one another along the left edge portion of the second fender portion 52. Specifically, the two guard fastening portions 56a and 56b are arranged along the left edge portion of the second fender portion 52. The guard fastening portions 56a and 56b preferably include holes 67a and 67b passing therethrough in the vehicle widthwise direction. A plurality of support member fastening portions 57a and 57b are disposed at the right edge portion of the second fender portion 52. The support member fastening portions 57a and 57b are portions to which the support member 36 is fastened. The support member fastening portions 57a and 57b are disposed in lateral symmetrical fashion with respect to the guard fastening portions 56a and 56b. Consequently, the support member fastening portions 57a and 57b are spaced apart in the lengthwise direction. The support member fastening portion 57a is situated frontward from the support member fastening portion 57b. The support member fastening portions 57a and 57b preferably include holes (not shown) passing therethrough in the vehicle widthwise direction.

As shown in FIG. 1, the second rear fender 28 is disposed above the first rear fender 34. The second rear fender 28 is attached to the seat frame portion 13, and extends diagonally downward and rearward from the lower surface of the rear cover portion 33.

As shown in FIGS. 2 and 3, the sari guard 35 is a member that is separate from the first rear fender 34. The sari guard 35, the support member 36, and the linking members 37, 38 are provided as separate bodies. The sari guard 35 is preferably formed from a metal such as iron. The sari guard 35 is arranged at least partially to the left side of the rear wheel 7. The lower portion of the sari guard 35 connects to the rear arm 26. The upper portion of the sari guard 35 connects to the first rear fender 34. The sari guard 35 is preferably connected to the first rear fender 34 at a plurality of connection locations spaced apart in the lengthwise direction of the first rear fender 34, specifically, at the plurality of guard fastening portions 56a and 56b mentioned previously.

Specifically, the sari guard 35 is composed of pipe-shaped members assembled into a grid form. As shown in FIG. 2, the sari guard 35 includes a rim portion 61, a plurality of lattice portions 62a to 62c, a plurality of first fender fastening portions 63a and 63b, and a plurality of first arm fastening portions 64a and 64b. The rim portion 61 has a shape that, in a side view, corresponds to a space bounded by the first rear fender 34 and the rear arm 26. In more specific terms, the rim portion 61 includes a first rim portion 61a, a second rim portion 61b, a third rim portion 61c, and a fourth rim portion 61d. As shown in FIG. 3, the first rim portion 61a has a linear shape along a portion of the rear surface of the first fender portion 51. The second rim portion 61b is situated to the rear of the first rim portion 61a and connects with the first rim portion 61a. The second rim portion 61b has a shape curved along the left edge portion of the second fender portion 52. The third rim portion 61c is situated below the first rim portion 61a and connects with the first rim portion 61a. The third rim portion 61c has a linear shape along the upper surface 41a of the first arm portion 41. The fourth rim portion 61d is situated below the second rim portion 61b. The fourth rim portion 61d is situated to the rear of the third rim portion 61c. The fourth rim portion 61d connects with the second rim portion 61b and the third rim portion 61c. As shown in FIG. 6, the third rim portion 61c is preferably situated outward from the second rim portion 61b in the vehicle widthwise direction.

The plurality of lattice portions 62a to 62c are disposed along the rim portion 61 and are fastened to the rim portion 61. Specifically, the lattice portions 62a to 62c are disposed extending between the second rim portion 61b and the third rim portion 61c. The lattice portions 62a to 62c are arranged spaced apart from one another. Therefore, in a side view the rear wheel 7 is visible between the lattice portions 62a to 62c.

The plurality of first fender fastening portions 63a and 63b shown in FIG. 2 are portions for fastening the sari guard 35 to the first rear fender 34. Specifically, the plurality of first fender fastening portions 63a and 63b are portions for fastening the sari guard 35 to the second fender portion 52. The first fender fastening portions 63a and 63b have a bent plate shape and are disposed on the second rim portion 61b. Specifically, the two first fender fastening portions 63a and 63b are disposed on the second rim portion 61b and arranged spaced apart from one another along the second rim portion 61b. The first fender fastening portions 63a and 63b preferably include holes 66a and 66b passing therethrough in the vehicle widthwise direction. The first fender fastening portion 63a is fastened to the guard fastening portion 56a by inserting a screw, for example, respectively through the hole 66a of the first fender fastening portion 63a and the hole 67a of the guard fastening portion 56a of the second fender portion 52 discussed previously. The first fender fastening portion 63b is fastened to the guard fastening portion 56b by inserting a screw, for example, through the hole 66b of the first fender fastening portion 63b and the hole 67b of the guard fastening portion 56b of the second fender portion 52 discussed previously. The sari guard 35 is thereby fastened to the second fender portion 52.

Figure 7:
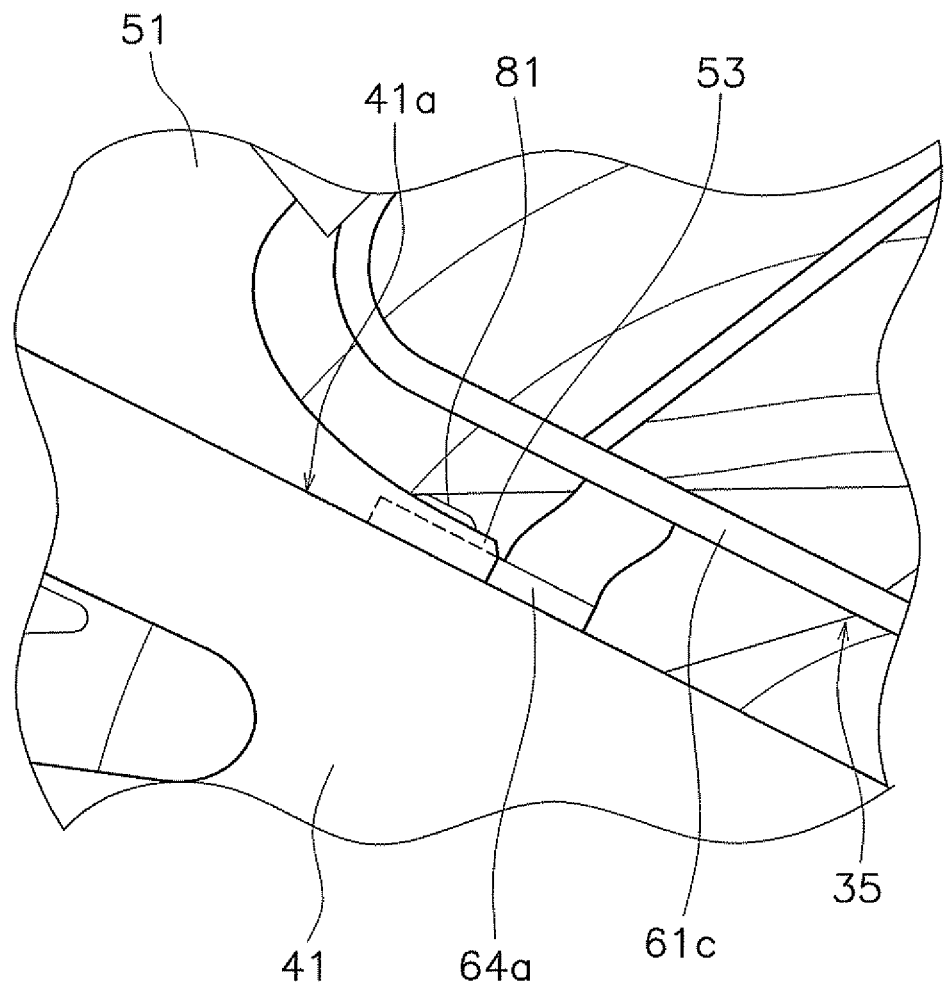
FIG. 7 is an enlarged view of a construction in the vicinity of a first projecting portion in FIG. 3.

The plurality of first arm fastening portions 64a and 64b are portions for fastening the sari guard 35 to the rear arm 26. Specifically, the plurality of first arm fastening portions 64a and 64b are portions for fastening the sari guard 35 to the first arm portion 41. The first arm fastening portions 64a and 64b have a bent plate shape and are disposed on the third rim portion 61c. Specifically, the two first arm fastening portions 64a and 64b are disposed on the third rim portion 61c and arranged spaced apart from one another along the third rim portion 61c. Of the first arm fastening portions 64a and 64b, the first arm fastening portion 64a, which is situated towards the front, is fastened to the upper surface 41a of the first arm portion 41. The first arm fastening portion 64a preferably includes a hole 65a passing therethrough in the vertical direction. As shown in FIG. 7, the first arm fastening portion 64a is inserted between the first projecting portion 53 of the first fender portion 51 discussed above and the upper surface 41a of the first arm portion 41. FIG. 7 is an enlarged view of the construction in the vicinity of the first projecting portion 53 in FIG. 3. By inserting a screw 81 through the hole 53a of the first projecting portion 53, the hole 65a of the first arm fastening portion 64a, and the hole 41b of the upper surface 41a of the first arm portion 41, the first arm fastening portion 64a is fastened to the first projecting portion 53 of the first fender portion 51, as well as to the upper surface 41a of the first arm portion 41. Of the two first arm fastening portions 64a and 64b, the first arm fastening portion 64b, which is situated towards the rear, is fastened to the rear end of the first arm portion 41. As shown in FIG. 2, the first arm fastening portion 64b preferably includes a hole 65b passing therethrough in the vehicle widthwise direction. At the rear end of the first arm portion 41, a hole 41c that passes through in the vehicle widthwise direction is disposed at a location corresponding to the hole 65b of the first arm fastening portion 64b. The first arm fastening portion 64b is fastened to the first arm portion 41 by inserting a screw through the hole 65b of the first arm fastening portion 64b and the hole 41c of the rear end of the first arm portion 41.

The support member 36 is a separate member from the first rear fender 34. The support member 36 is preferably made of a metal such as iron. The support member 36 is arranged at least partly to the right side of the rear wheel 7. Consequently, the rear wheel 7 is arranged between at least a portion of the sari guard 35 and at least a portion of the support member 36 in the vehicle widthwise direction. The lower portion of the support member 36 connects to the rear arm 26. The upper portion of the support member 36 connects to the first rear fender 34. The support member 36 connects to the first rear fender 34 at a plurality of connection locations spaced apart in the lengthwise direction of the first rear fender 34, specifically, at the plurality of support member fastening portions 57a and 57b.

Specifically, the support member 36 is composed of pipe-shaped members. The support member 36 includes a rim portion 71, a plurality of second fender fastening portions 72a and 72b, and a plurality of second arm fastening portions 73a and 73b. The rim portion 71 is arranged between the first rear fender 34 and the rear arm 26 in a side view. The rim portion 71 includes a first rim portion 71a, a second rim portion 71b, a third rim portion 71c, and a fourth rim portion 71d. As shown in FIG. 4, the first rim portion 71a has a shape that curves along the right edge portion of the second fender portion 52. The second rim portion 71b has a linear shape along the upper surface 42a of the second arm portion 42. The third rim portion 71c links the front portion of the first rim portion 71a with the front portion of the second rim portion 71b. The fourth rim portion 71d is situated rearward of the third rim portion 71c, and links the rear portion of the first rim portion 71a with the rear portion of the second rim portion 71b. As shown in FIG. 6, the second rim portion 71b is preferably situated outward from the first rim portion 71a in the vehicle widthwise direction.

The plurality of second fender fastening portions 72a and 72b are portions for fastening the support member 36 to the first rear fender 34. Specifically, the plurality of second fender fastening portions 72a and 72b are portions for fastening the support member 36 to the second fender portion 52. The second fender fastening portions 72a and 72b have a bent plate shape and are disposed on the first rim portion 71a. Specifically, the two second fender fastening portions 72a and 72b are disposed on the first rim portion 71a and are arranged spaced apart from one another along the first rim portion 71a. The second fender fastening portions 72a and 72b preferably include holes 68a and 68b passing therethrough in the vehicle widthwise direction. The second fender fastening portion 72a is fastened to the support member fastening portion 57a by passing a screw through the hole 68a of the second fender fastening portion 72a and the hole 57a of the support member fastening portion 57a of the second fender portion 52 mentioned above. The second fender fastening portion 72b is fastened to the support member fastening portion 57b by inserting a screw through the hole 68b of the second fender fastening portion 72b and the hole of the support member fastening portion 57b of the second fender portion 52. The support member 36 is thereby fastened to the second fender portion 52.

Figure 8:
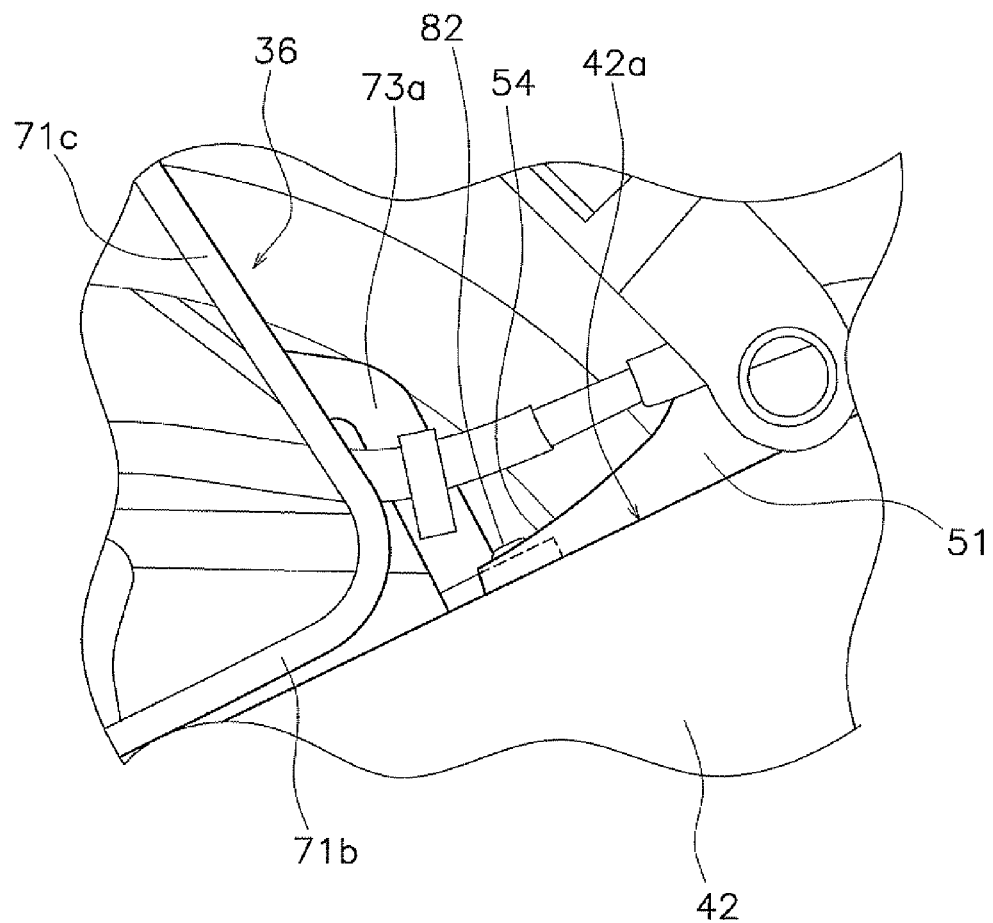
FIG. 8 is an enlarged view of a construction in the vicinity of a second projecting portion in FIG. 4.

The plurality of second arm fastening portions 73a and 73b are portions for fastening the support member 36 to the rear arm 26. Specifically, the plurality of second arm fastening portions 73a and 73b are portions for fastening the support member 36 to the second arm portion 42. Specifically, the two second arm fastening portions 73a and 73b are disposed spaced apart in the lengthwise direction. Of the two second arm fastening portions 73a and 73b, the second arm fastening portion 73a, which is situated to the front, is disposed on the third rim portion 71c and is fastened to the upper surface 42a of the second arm portion 42. The second arm fastening portion 73a includes a hole (not shown) passing therethrough in the vertical direction. As shown in FIG. 8, the second arm fastening portion 73a is inserted between the second projecting portion 54 of the first fender portion 51 mentioned above and the upper surface 42a of the second arm portion 42. FIG. 8 is an enlarged view of the construction in the vicinity of the second projecting portion 54 in FIG. 4. By inserting a screw 82 through the hole 54a of the second projecting portion 54, the hole of the second arm fastening portion 73a, and the hole 42b of the upper surface 42a of the second arm portion 42, the second arm fastening portion 73a is fastened to the second projecting portion 54 of the first fender portion 51, as well as to the upper surface 42a of the second arm portion 42. Of the two second arm fastening portions 73a and 73b, the second arm fastening portion 73b, which is situated to the rear, is disposed on the fourth rim portion 71b and is fastened to the rear end of the second arm portion 42. As shown in FIG. 2, the second arm fastening portion 73b preferably includes a hole 69b passing therethrough in the vehicle widthwise direction. At the rear end of the second arm portion 42, a hole 42c passing through in the vehicle widthwise direction is disposed at a location corresponding to the hole 69b of the second arm fastening portion 73b. The second arm fastening portion 73b is fastened to the second arm portion 42 by inserting a screw through the hole 69b of the second arm fastening portion 73b and the hole 42c of the rear end of the second arm portion 42.

The front portion of the first rim portion 71a, the second fender fastening portion 72a, the third rim portion 71c, and the second arm fastening portion 73a constitute the first support portion of a preferred embodiment of the present invention. The rear portion of the first rim portion 71a, the second fender fastening portion 72b, the fourth rim portion 71d, and the second arm fastening portion 73b constitute the second support portion of a preferred embodiment of the present invention. Consequently, the connecting portion of the first support portion and the first rear fender 34 is situated frontward from the connecting portion of the second support portion and the first rear fender 34. The portion of the first rim portion 71a that lies between the second fender fastening portion 72a and the second fender fastening portion 72b, together with the second rim portion 71b, constitute the linking portion of a preferred embodiment of the present invention.

As shown in FIG. 6, the foot step 23 mentioned above is situated outward from the sari guard 35 in the vehicle widthwise direction. Consequently, the lower portion of the step support member 24 is situated outward from the sari guard 35 in the vehicle widthwise direction. The lower portion of the step support member 24 is also situated outward from the lower left seat frame 17a in the vehicle widthwise direction. The upper portion of the step support member 24 is situated inward from the sari guard 35 in the vehicle widthwise direction. The upper portion of the step support member 24 is also situated inward from the lower left seat frame 17a in the vehicle widthwise direction. Consequently, the step support member 24 extends from a location inward from the lower left seat frame 17a in the vehicle widthwise direction to a location outward from the sari guard 35 in the vehicle widthwise direction. The step support member 24 also extends from a location inward from the sari guard 35 in the vehicle widthwise direction to a location outward from the sari guard 35 in the vehicle widthwise direction. Consequently, even if the sari guard 35 moves upward together with the rear wheel 7, the sari guard 35 will not interfere with the foot step 23.

Similarly, the foot step 29 is situated outward from the support member 36 in the vehicle widthwise direction. Consequently, the lower portion of the step support member 39 is situated outward from the support member 36 in the vehicle widthwise direction. The lower portion of the step support member 39 is situated outward from the lower right seat frame 17b in the vehicle widthwise direction. The upper portion of the step support member 39 is situated inward from the support member 36 in the vehicle widthwise direction. The upper portion of the step support member 39 is also situated inward from the lower right seat frame 17b in the vehicle widthwise direction. Consequently, the step support member 39 extends from a location inward from the lower right seat frame 17b in the vehicle widthwise direction to a location outward from the support member 36 in the vehicle widthwise direction. Also, the step support member 39 extends from a location inward from the support member 36 in the vehicle widthwise direction to a location outward from the support member 36 in the vehicle widthwise direction. Consequently, even if the support member 36 moves upward together with the rear wheel 7, the support member 36 will not interfere with the foot step 29.

The plurality of linking members 37 and 38 are members for linking the sari guard 35 and the support member 36. The linking members 37 and 38 are arranged below the first rear fender 34. The linking members 37 and 38 are at least partly arranged between the first rear fender 34 and the rear wheel 7 in the vertical direction. Specifically, the linking members 37 and 38 are arranged below the second fender portion 52. The plurality of linking members 37 and 38 are respectively arranged along the lower surface of the second fender portion 52, and arranged spaced apart from one another in the lengthwise direction. In the present preferred embodiment, two linking members, namely, the first linking member 37 and the second linking member 38, are provided.

The first linking member 37 is a member having a plate shape extending in the vehicle widthwise direction. A first bent portion 37a and second bent portion 37b formed in a downwardly bent shape are respectively provided at the two ends of the first linking member 37. The first bent portion 37a preferably includes a hole 75a passing therethrough in the vehicle widthwise direction. The second bent portion 37b preferably includes a hole 75b passing therethrough in the vehicle widthwise direction.

Figure 9:
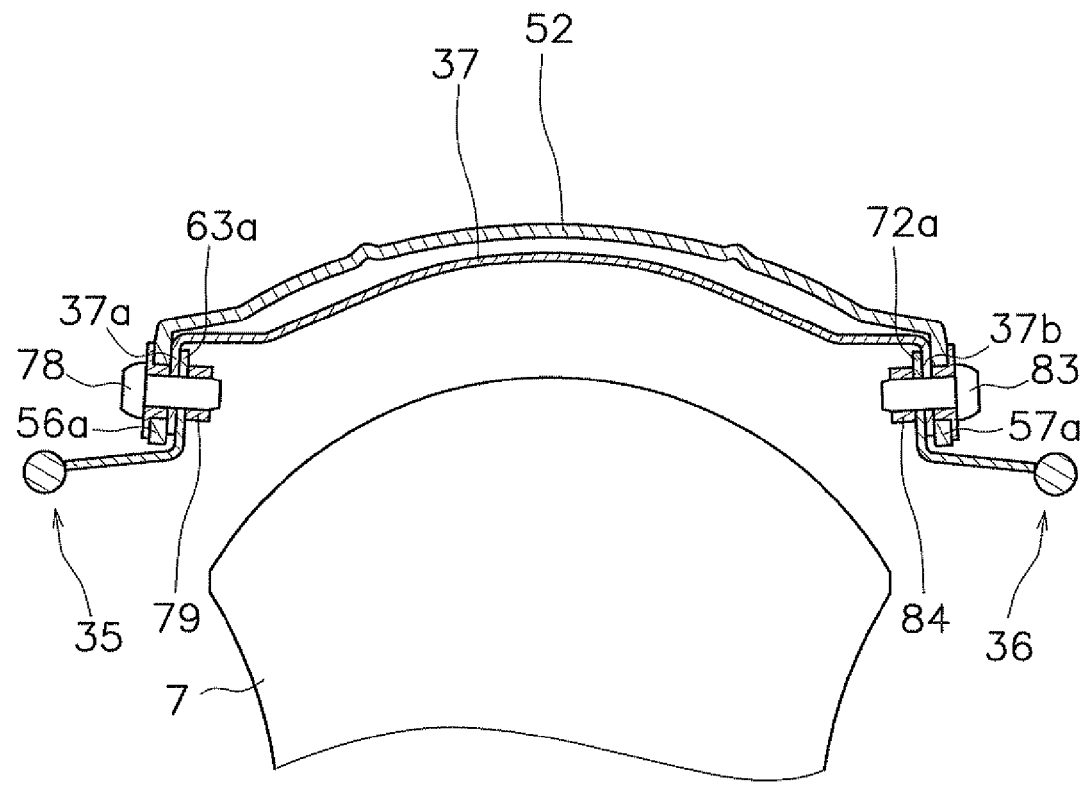
FIG. 9 is a cross-sectional view across IX-IX in FIG. 3.
Figure 10:
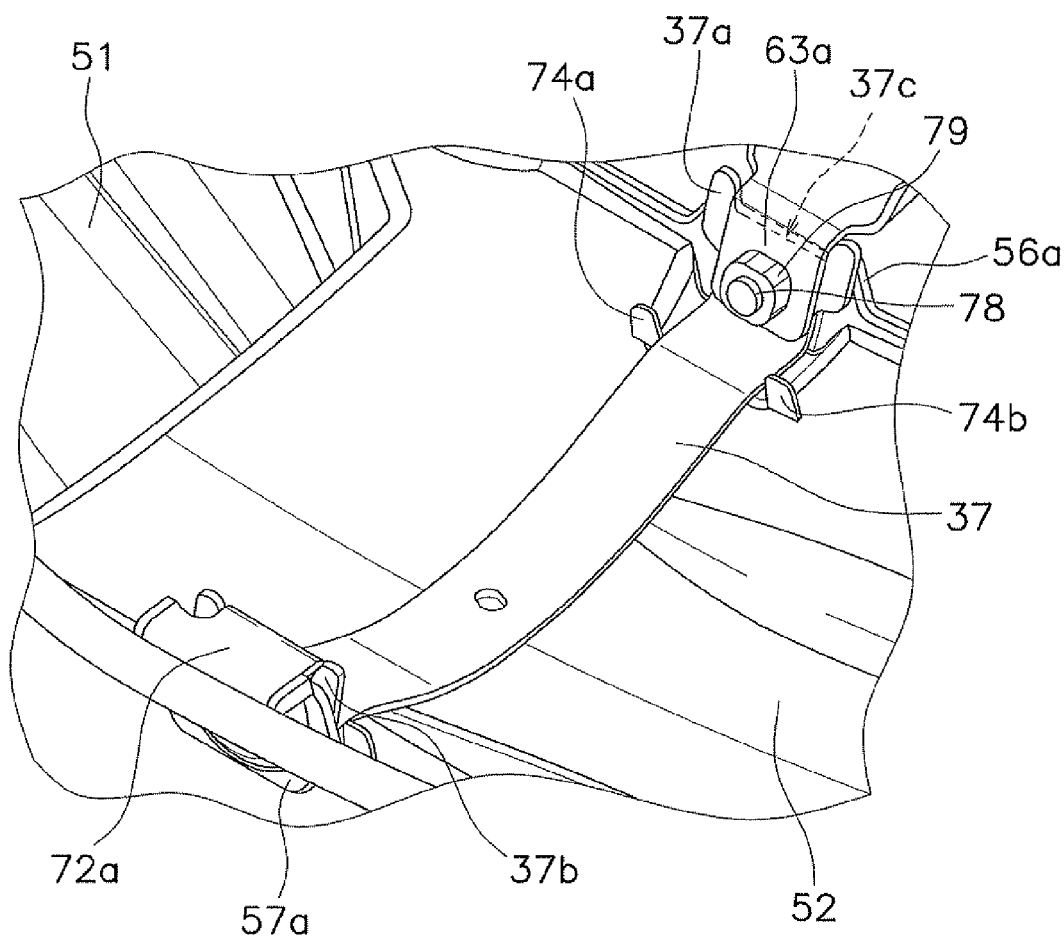
FIG. 10 is an enlarged view of a construction in the vicinity of a first linking member arranged below the rear fender.
Figure 11:
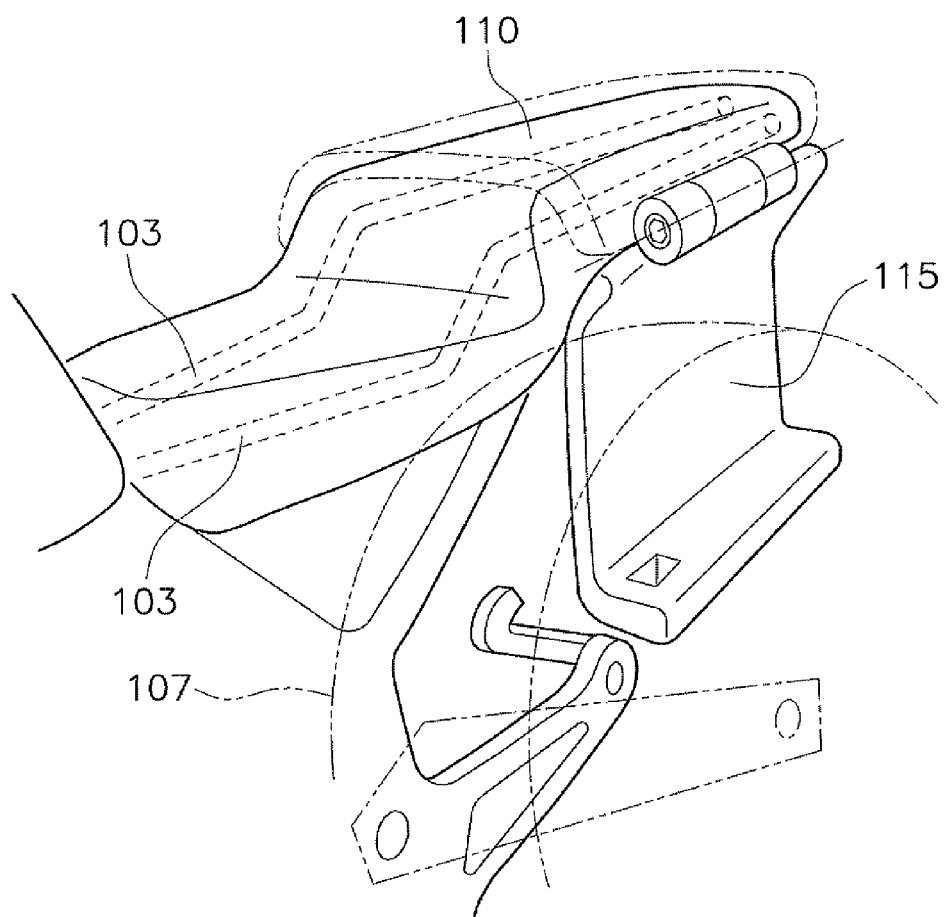
FIG. 11 shows a support structure of a sari guard in the related art.
Figure 12:
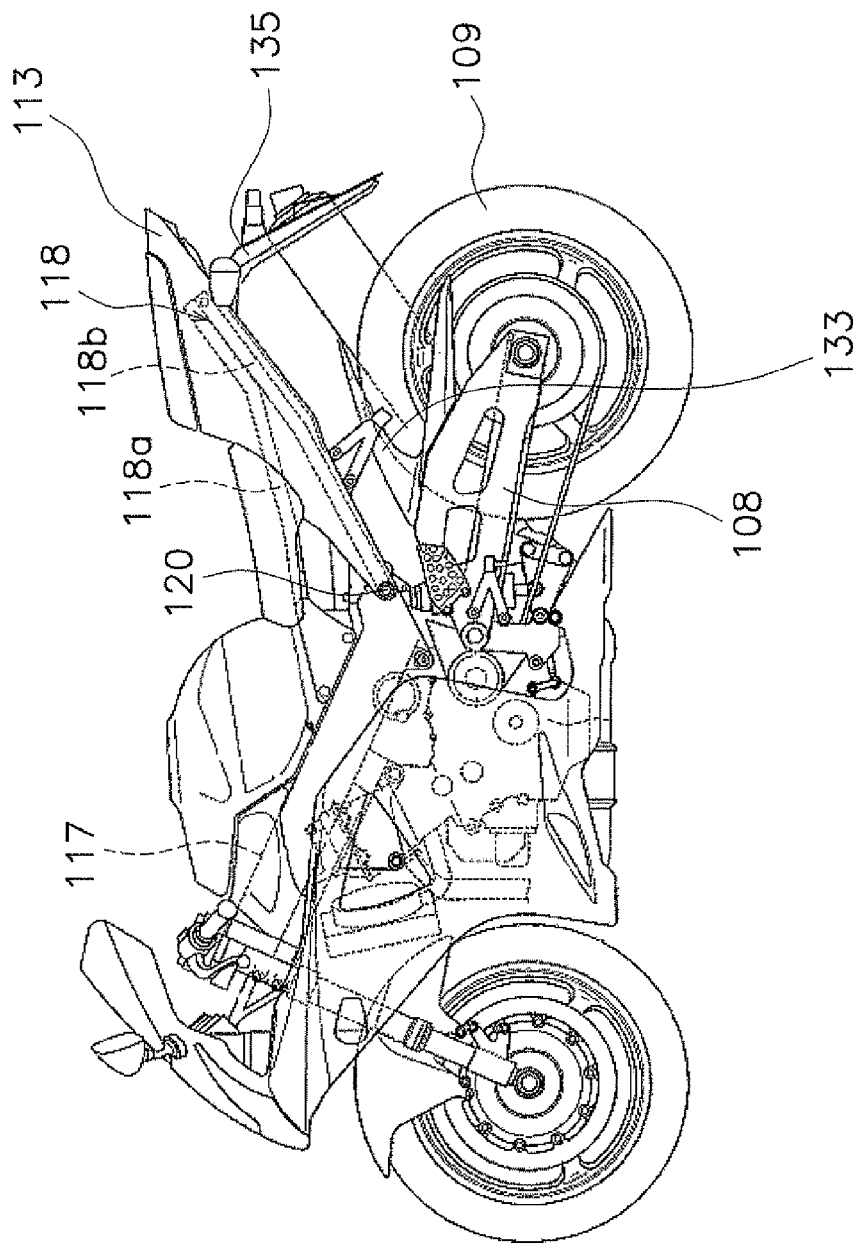
FIG. 12 shows a construction of a rear fender in the related art.

As shown in FIGS. 9 and 10, the first bent portion 37a is arranged inward from the guard fastening portion 56a of the second fender portion 52 in the vehicle widthwise direction. FIG. 9 is a cross-sectional view across IX-IX in FIG. 3. FIG. 10 is an enlarged view of the construction in the vicinity of the first linking member 37, when arranged with the lower surface of the second fender portion 52 facing upward. As shown in FIG. 10, on the lower surface of the second fender portion 52, i.e., in the portion thereof situated inward from the guard fastening portion 56a in the vehicle widthwise direction, there are disposed a pair of ribs 74a and 74b. These ribs 74a and 74b are arranged spaced apart in the lengthwise direction. The first linking member 37 is positioned by arrangement between these ribs 74a and 74b. The first fender fastening portion 63a of the sari guard 35 is arranged inward from the first bent portion 37a in the vehicle widthwise direction. The lower end portion of the first bent portion 37a includes a recessed portion 37c with an upwardly recessed shape. The first fender fastening portion 63a of the sari guard 35 is positioned by arrangement within this recessed portion 37c. As shown in FIG. 9, by threading a nut 79 onto a bolt 78 that has been inserted through the hole 66a of the first fender fastening portion 63a of the sari guard 35, the hole 75a of the first bent portion 37a, and the hole 67a of the guard fastening portion 56a of the second fender portion 52, the sari guard 35 and the first linking member 37 are linked, and are also fastened to the second fender portion 52.

The second bent portion 37b is arranged inward from the support member fastening portion 57a of the second fender portion 52 in the vehicle widthwise direction. The second fender fastening portion 72a of the support member 36 is positioned inward from the second bent portion 37b in the vehicle widthwise direction. As shown in FIG. 9, by threading a nut 84 onto a bolt 83 that has been inserted through the hole 68a of the second fender fastening portion 72a of the support member 36, the hole 75b of the second bent portion 37b, and the hole of the support member fastening portion 57a of the second fender portion 52, the support member 36 and the first linking member 37 are linked, and are also fastened to the second fender portion 52. On the lower surface of the second fender portion 52, i.e., in the portion thereof situated inward from the support member fastening portion 57a in the vehicle widthwise direction, there are disposed ribs similar to the ribs 74a and 74b which are provided for the guard fastening portion 56a. The second bent portion 37b is also provided at the lower end portion thereof with a recessed portion similar to the recessed portion 37c of the first bent portion 37a.

The second linking member 38 includes a construction similar to the first linking member 37. The second linking member 38, like the first linking member 37, is fastened to the sari guard 35 and the second fender portion 52. The second linking member 38, like the first linking member 37, links the sari guard 35 and the support member 36, and is fastened to the second fender portion 52.

The motorcycle 1 according to the present preferred embodiment has features such as the following.

Because the rear end of the first rear fender 34, which moves in tandem with the rear arm 26 and the rear wheel 7, is situated rearward from the upper end of the rear wheel 7, mud splatter from the rear wheel 7 can be inhibited. Additionally, the lower portion of the sari guard 35 connects to the rear arm 26, and the upper portion of the sari guard 35 connects to the first rear fender 34. Consequently, the first rear fender 34 is supported not only by the rear arm 26 but also by the sari guard 35. Therefore, despite the increased size of the first rear fender 34 in the vehicle lengthwise direction, the effects of vibration on the first rear fender 34 can be inhibited. Specifically, even though the first rear fender 34 extends to a location rearward of the upper end of the rear wheel 7, vibration of the first rear fender 34 is inhibited. The sari guard 35 connects to the rear arm 26 and to the first rear fender 34. Therefore, an increased size of the seat frame portion 13 and the rear cover portion 33 can be inhibited, in contrast to the case where the sari guard 35 connects to the seat frame portion 13. An increased size of the rear portion of the vehicle can thereby be inhibited. From the above, it will be appreciated that according to the present preferred embodiment of the present invention it is possible to concomitantly inhibit mud splatter from the rear wheel 7, inhibit vibration of the first rear fender 34, and inhibit an increased size of the rear portion of the vehicle. An increased size of the rear portion of the vehicle refers to an increased size of the frame for the purpose of ensuring rigidity, such as an increased thickness of the frame, for example. Alternatively, an increased size of the rear portion of the vehicle may refer to a larger body cover 8 in association with a larger truss structure composed of the main frame portion 12, the upper seat frame 16, and the lower seat frame 17.

The sari guard 35 moves up and down together with the rear wheel 7. Therefore, there is no need to make the sari guard 35 larger in consideration of the vertical motion of the rear wheel 7. That is, the sari guard 35 can be smaller compared to the prior art.

Because the left and right edge portions of the first rear fender 34 are supported by the sari guard 35 and the support member 36, respectively, support rigidity of the first rear fender 34 is further improved. Therefore, the effects of vibration from the rear wheel 7 on the first rear fender 34 can be further inhibited.

Because the sari guard 35 and the support member 36 are linked by the linking members 37 and 38, the support rigidity of the first rear fender 34 can be further improved. Moreover, the linking members 37 and 38 are positioned between the first rear fender 34 and the rear wheel 7 in the vertical direction. Therefore, the curved portions of the linking members 37 and 38 can be smaller as compared with the case where the linkage of the sari guard 35 and the support member 36 passes above the first rear fender 34, and the linking members 37 and 38 can also be shorter.

Because the linking members 37 and 38 are plate shaped, the rear wheel 7 and the first rear fender 34 can be arranged closer together. The rear wheel 7 and the first rear fender 34 can thereby be made smaller.

Because the sari guard 35, the support member 36, and the linking members 37 and 38 are provided as separate bodies, they can be transported in respectively dissociated states. In this case, deformation due to external force is less likely to occur, as compared to the case where the sari guard 35, the support member 36, and the linking members 37 and 38 are unified. That is, if it is assumed that the sari guard 35, the support member 36, and the linking members 37 and 38 are integrally formed as a single component, this means that either the sari guard 35 or the support member 36 is cantilevered. The component is therefore susceptible to deformation during transport. According to the present preferred embodiment, on the other hand, where the sari guard 35, the support member 36, and the linking members 37 and 38 are dissociated, the portions do not readily undergo deformation when external force is applied. Therefore, these elements can be easily transported, while inhibiting deformation of the sari guard 35, the support member 36, and the linking members 37 and 38.

The sari guard 35 supports the first rear fender 34 at a plurality of connection locations spaced apart in the lengthwise direction of the first rear fender 34. Specifically, the sari guard 35 supports the second fender portion 52 at the plurality of first fender fastening portions 63a and 63b which are spaced apart in the lengthwise direction of the second fender portion 52. Therefore, even if the first rear fender 34 has an increased size in the lengthwise direction, diminished support rigidity of the first rear fender 34 can be inhibited.

The tandem seat 22 is situated rearward from and above the main seat 21. Even when the rear wheel 7 has moved to the uppermost extent, no overlap of first rear fender 34 and the seat frame portion 13 is observed in a plan view. Therefore, the rear portion of the vehicle can be made smaller, while ensuring visibility of the tandem rider.

In the conventional art example, the footrest portion for the tandem rider is disposed on the sari guard. In contrast to this, in the present preferred embodiment, the foot step 23 is attached to the seat frame portion 13 separately from the sari guard 35. Consequently, the sari guard 35 moves up and down together with the rear wheel 7, but the foot of the tandem rider is retained by the foot step 23. In order to improve the comfort of the tandem rider when riding, it is preferable for the foot step 23 to be situated somewhat outward in the vehicle widthwise direction. However, according to the integral construction of the sari guard and the rear footrest portion which is taught in the conventional art example, if the rear footrest portion is situated outward in the vehicle widthwise direction the sari guard will have an increased size. As a result, the rear portion of the vehicle will have an increased size. According to the present preferred embodiment, on the other hand, because the foot step 23 is provided separately from the sari guard 35, even if the foot step 23 is situated outward in the vehicle widthwise direction, an increased size of the sari guard 35 is inhibited. It is thereby possible to make the rear portion of the vehicle smaller while ensuring the comfort of the tandem rider when riding. The foot step 29 has an effect comparable to that of the foot step 23.

While the present invention has been described above in terms of one preferred embodiment, it is to be understood that the preferred embodiment described hereinabove is not limiting of the invention, and that various modifications are possible without departing from the scope of the invention. For example, the shape of the sari guard 35 is not limited to that disclosed herein. Optionally, the sari guard 35 may be of mesh or have a plate shape. Likewise, the shape of the support member 36 is not limited to that taught in the preceding preferred embodiment. For example, the support member 36 may have a grid, mesh, or plate form. Optionally, it is possible to provide the sari guard 35 only, without providing the support member 36.

The motorcycle 1 disclosed herein is a motorcycle in the narrow sense, that is, a road sports type. However, in the present invention, motorcycle refers to motorcycles in a broader sense and is not limited to motorcycles in a narrow sense. Specifically, in the present invention, motorcycle is used in a sense that, in addition to motorcycles in the narrow sense, a motorcycle also includes off-road vehicles, mopeds, scooters, and the like.

In the present invention, to "extend rearward" is not limited to extension in a direction parallel to the vehicle lengthwise direction. Specifically, to "extend rearward" includes extension in a direction inclined with respect to the horizontal direction. Likewise, to "extend in the lengthwise direction" includes instances of extension along a direction inclined with respect to the horizontal direction.

Optionally, the first main frame portion 12a and the second main frame portion 12b may be integrally formed. Specifically, the first main frame portion 12a and the second main frame portion 12b may constitute portions that are included in a single, integrally formed component. Additionally, in FIG. 1, the connection site of the first main frame portion 12a and the second main frame portion 12b in the main frame portion 12 is situated between the connecting portion of the upper seat frame 16 and the main frame portion 12, and the connecting portion of the lower seat frame 17 and the main frame portion 12. However, the connection site of the first main frame portion 12a and the second main frame portion 12b is not limited to any particular location.

According to the present preferred embodiment, the first support portion and the second support portion are integrally formed by virtue of being included as portion of the support member 36. However, the first support portion and the second support portion may be provided as separate bodies and positioned spaced apart in the lengthwise direction.

According to preferred embodiments of the present invention it is possible to concomitantly inhibit mud splatter from the rear wheel, inhibit vibration of the rear fender, and inhibit an increased size of the vehicle rear portion. Therefore, the present invention has utility as a motorcycle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motorcycle comprising:
   a main frame portion;
   a seat frame portion connected to the main frame portion and extending rearward;
   a seat arranged above the seat frame portion;
   a rear wheel arranged below the seat frame portion;
   a rear arm supporting the rear wheel in a vertically moveable fashion;
   a rear fender connected to the rear arm and situated at least partly between the seat frame portion and the rear wheel in a vertical direction; and
   a sari guard arranged at least partly to a side of the rear wheel; wherein
   a rear end of the rear fender is situated rearward from an upper end of the rear wheel;
   a lower portion of the sari guard is connected to the rear arm; and
   an upper portion of the sari guard is connected to the rear fender; wherein
   the sari guard is removably connected to the rear fender.

2. The motorcycle according to claim 1, further comprising a support member, the support member including:
   a lower portion connected to the rear arm; and
   an upper portion connected to the rear fender; wherein
   the rear wheel is arranged between at least a portion of the sari guard and at least a portion of the support member in a vehicle widthwise direction.

3. The motorcycle according to claim 2, wherein the support member includes a first support portion and a second support portion; and
   a connecting portion of the first support portion and the rear fender is situated frontward from a connecting portion of the second support portion and the rear fender.

4. The motorcycle according to claim 3, wherein the support member further includes a linking portion linking the first support portion and the second support portion.

5. The motorcycle according to claim 2, further comprising a linking member linking the sari guard and the support member, wherein the linking member is arranged at least partly between the rear fender and the rear wheel in the vertical direction.

6. The motorcycle according to claim 5, wherein the linking member is a plate-shaped member.

7. The motorcycle according to claim 5, wherein the sari guard, the support member, and the linking member are separate bodies.

8. The motorcycle according to claim 1, wherein the sari guard connects to the rear fender at a plurality of connection locations spaced apart in a lengthwise direction of the rear fender.

9. The motorcycle according to claim 1, wherein the seat includes a first seat and a second seat arranged rearward from and above the first seat;
   the second seat is arranged above a rear portion of the seat frame portion; and
   there is no overlap of the rear fender and the seat frame portion in a side view of the motorcycle when the rear wheel moves vertically to an uppermost extent.

10. A motorcycle comprising:
    a main frame portion;
    a seat frame portion connected to the main frame portion and extending rearward;
    a seat arranged above the seat frame portion;
    a rear wheel arranged below the seat frame portion;
    a rear arm supporting the rear wheel in a vertically moveable fashion;
    a rear fender connected to the rear arm and situated at least partly between the seat frame portion and the rear wheel in a vertical direction; and
    a sari guard arranged at least partly to a side of the rear wheel; wherein a rear end of the rear fender is situated rearward from an upper end of the rear wheel;
a lower portion of the sari guard is connected to the rear arm; and
an upper portion of the sari guard is connected to the rear fender; wherein
the sari guard is connected to the rear fender at a location rearward of the upper end of the rear wheel.

11. A motorcycle comprising:
a main frame portion;
a seat frame portion connected to the main frame portion and extending rearward;
a seat arranged above the seat frame portion;
a rear wheel arranged below the seat frame portion;
a rear arm supporting the rear wheel in a vertically moveable fashion;
a rear fender connected to the rear arm and situated at least partly between the seat frame portion and the rear wheel in a vertical direction; and
a sari guard arranged at least partly to a side of the rear wheel; wherein
a rear end of the rear fender is situated rearward from an upper end of the rear wheel;
a lower portion of the sari guard is connected to the rear arm; and
an upper portion of the sari guard is connected to the rear fender; wherein
the sari guard is located at a side of at least a portion of the rear wheel that is rearward of the upper end of the rear wheel.

12. The motorcycle according to claim 1, wherein the sari guard includes a rim portion and a plurality of lattice portions extending across the rim portion.

13. The motorcycle according to claim 1, wherein the sari guard includes a first rim portion, a second rim portion, a third rim portion, and a fourth rim portion, the second rim portion has a shape that extends along the rear fender, and the third rim portion has a shape that extends along the rear arm.

14. A motorcycle comprising:
a main frame portion;
a seat frame portion connected to the main frame portion and extending rearward;
a seat arranged above the seat frame portion;
a rear wheel arranged below the seat frame portion;
a rear arm supporting the rear wheel in a vertically moveable fashion;
a rear fender connected to the rear arm and situated at least partly between the seat frame portion and the rear wheel in a vertical direction; and
a sari guard arranged at least partly to a side of the rear wheel; wherein
a rear end of the rear fender is situated rearward from an upper end of the rear wheel;
a lower portion of the sari guard is connected to the rear arm; and
an upper portion of the sari guard is connected to the rear fender; wherein
a rear end of the sari guard is located rearward from a rear end of the rear arm.

15. The motorcycle according to claim 10, further comprising a support member, the support member including:
a lower portion connected to the rear arm; and
an upper portion connected to the rear fender; wherein
the rear wheel is arranged between at least a portion of the sari guard and at least a portion of the support member in a vehicle widthwise direction.

16. The motorcycle according to claim 15, wherein the support member includes a first support portion and a second support portion; and
a connecting portion of the first support portion and the rear fender is situated frontward from a connecting portion of the second support portion and the rear fender.

17. The motorcycle according to claim 16, wherein the support member further includes a linking portion linking the first support portion and the second support portion.

18. The motorcycle according to claim 15, further comprising a linking member linking the sari guard and the support member, wherein the linking member is arranged at least partly between the rear fender and the rear wheel in the vertical direction.

19. The motorcycle according to claim 18, wherein the linking member is a plate-shaped member.

20. The motorcycle according to claim 18, wherein the sari guard, the support member, and the linking member are separate bodies.

21. The motorcycle according to claim 10, wherein the sari guard connects to the rear fender at a plurality of connection locations spaced apart in a lengthwise direction of the rear fender.

22. The motorcycle according to claim 10, wherein the seat includes a first seat and a second seat arranged rearward from and above the first seat;
the second seat is arranged above a rear portion of the seat frame portion; and
there is no overlap of the rear fender and the seat frame portion in a side view of the motorcycle when the rear wheel moves vertically to an uppermost extent.

23. The motorcycle according to claim 10, wherein the sari guard includes a rim portion and a plurality of lattice portions extending across the rim portion.

24. The motorcycle according to claim 10, wherein the sari guard includes a first rim portion, a second rim portion, a third rim portion, and a fourth rim portion, the second rim portion has a shape that extends along the rear fender, and the third rim portion has a shape that extends along the rear arm.

25. The motorcycle according to claim 11, further comprising a support member, the support member including:
a lower portion connected to the rear arm; and
an upper portion connected to the rear fender; wherein
the rear wheel is arranged between at least a portion of the sari guard and at least a portion of the support member in a vehicle widthwise direction.

26. The motorcycle according to claim 25, wherein the support member includes a first support portion and a second support portion; and
a connecting portion of the first support portion and the rear fender is situated frontward from a connecting portion of the second support portion and the rear fender.

27. The motorcycle according to claim 26, wherein the support member further includes a linking portion linking the first support portion and the second support portion.

28. The motorcycle according to claim 25, further comprising a linking member linking the sari guard and the support member, wherein the linking member is arranged at least partly between the rear fender and the rear wheel in the vertical direction.

29. The motorcycle according to claim 28, wherein the linking member is a plate-shaped member.

30. The motorcycle according to claim 28, wherein the sari guard, the support member, and the linking member are separate bodies.

31. The motorcycle according to claim 11, wherein the sari guard connects to the rear fender at a plurality of connection locations spaced apart in a lengthwise direction of the rear fender.

32. The motorcycle according to claim 11, wherein the seat includes a first seat and a second seat arranged rearward from and above the first seat;
   the second seat is arranged above a rear portion of the seat frame portion; and
   there is no overlap of the rear fender and the seat frame portion in a side view of the motorcycle when the rear wheel moves vertically to an uppermost extent.

33. The motorcycle according to claim 11, wherein the sari guard includes a rim portion and a plurality of lattice portions extending across the rim portion.

34. The motorcycle according to claim 11, wherein the sari guard includes a first rim portion, a second rim portion, a third rim portion, and a fourth rim portion, the second rim portion has a shape that extends along the rear fender, and the third rim portion has a shape that extends along the rear arm.

35. The motorcycle according to claim 14, further comprising a support member, the support member including:
   a lower portion connected to the rear arm; and
   an upper portion connected to the rear fender; wherein
   the rear wheel is arranged between at least a portion of the sari guard and at least a portion of the support member in a vehicle widthwise direction.

36. The motorcycle according to claim 35, wherein the support member includes a first support portion and a second support portion; and
   a connecting portion of the first support portion and the rear fender is situated frontward from a connecting portion of the second support portion and the rear fender.

37. The motorcycle according to claim 36, wherein the support member further includes a linking portion linking the first support portion and the second support portion.

38. The motorcycle according to claim 35, further comprising a linking member linking the sari guard and the support member, wherein the linking member is arranged at least partly between the rear fender and the rear wheel in the vertical direction.

39. The motorcycle according to claim 38, wherein the linking member is a plate-shaped member.

40. The motorcycle according to claim 38, wherein the sari guard, the support member, and the linking member are separate bodies.

41. The motorcycle according to claim 14, wherein the sari guard connects to the rear fender at a plurality of connection locations spaced apart in a lengthwise direction of the rear fender.

42. The motorcycle according to claim 14, wherein the seat includes a first seat and a second seat arranged rearward from and above the first seat;
   the second seat is arranged above a rear portion of the seat frame portion; and
   there is no overlap of the rear fender and the seat frame portion in a side view of the motorcycle when the rear wheel moves vertically to an uppermost extent.

43. The motorcycle according to claim 14, wherein the sari guard includes a rim portion and a plurality of lattice portions extending across the rim portion.

44. The motorcycle according to claim 14, wherein the sari guard includes a first rim portion, a second rim portion, a third rim portion, and a fourth rim portion, the second rim portion has a shape that extends along the rear fender, and the third rim portion has a shape that extends along the rear arm.

* * * * *